United States Patent
Montgomery et al.

(10) Patent No.: US 6,892,693 B2
(45) Date of Patent: May 17, 2005

(54) PISTON FOR SPARK-IGNITED DIRECT FUEL INJECTION ENGINE

(75) Inventors: David T. Montgomery, Pleasant Prairie, WI (US); Sebastian Strauss, Pleasant Prairie, WI (US)

(73) Assignee: Bombardier Recreational Products, Inc., Valcourt (CA)

( * ) Notice: Subject to any disclaimer, the term of this patent is extended or adjusted under 35 U.S.C. 154(b) by 0 days.

(21) Appl. No.: 10/248,722

(22) Filed: Feb. 12, 2003

(65) Prior Publication Data

US 2004/0154579 A1 Aug. 12, 2004

(51) Int. Cl.⁷ .................................................. F02F 3/26
(52) U.S. Cl. ........................................ 123/276; 123/279
(58) Field of Search ................................. 123/276, 279, 123/285, 193.6, 195 P; 440/900

(56) References Cited

U.S. PATENT DOCUMENTS

| | | | |
|---|---|---|---|
| 1,803,250 A | * | 4/1931 | Hemmingsen ............... 123/276 |
| 3,020,900 A | | 2/1962 | Hoffman |
| 3,083,700 A | * | 4/1963 | Kerr et al. .................... 123/276 |
| 3,144,008 A | * | 8/1964 | List ............................. 123/256 |
| 3,498,276 A | | 3/1970 | Hardenberg |
| 3,945,351 A | | 3/1976 | Kimbara et al. |
| 4,164,913 A | | 8/1979 | Komiyama et al. |
| 4,176,628 A | | 12/1979 | Kanai et al. |
| 4,207,843 A | | 6/1980 | List et al. |
| 4,221,190 A | | 9/1980 | Komiyama et al. |
| 4,428,340 A | * | 1/1984 | Nikly .......................... 123/276 |
| 4,433,616 A | | 2/1984 | Hauser |
| 4,510,895 A | | 4/1985 | Slee |
| 4,516,549 A | * | 5/1985 | Brear .......................... 123/276 |
| 4,562,807 A | * | 1/1986 | Matsui ........................ 123/276 |
| 4,617,887 A | | 10/1986 | Nagase et al. |
| 4,676,208 A | | 6/1987 | Moser et al. |
| 4,693,219 A | | 9/1987 | Burgio |
| 4,709,672 A | * | 12/1987 | Ishida ......................... 123/256 |
| 4,770,138 A | | 9/1988 | Onishi |
| 4,883,032 A | | 11/1989 | Hunter et al. |
| 4,941,440 A | | 7/1990 | Weber et al. |
| 4,955,338 A | * | 9/1990 | Diwakar et al. ............. 123/276 |
| 4,972,898 A | | 11/1990 | Cole |
| 5,020,485 A | | 6/1991 | Watanabe |
| 5,158,055 A | | 10/1992 | Oh et al. |
| 5,209,200 A | | 5/1993 | Ahern et al. |
| 5,357,924 A | | 10/1994 | Onishi |
| 5,373,820 A | * | 12/1994 | Sakamoto et al. .......... 123/295 |
| 5,595,145 A | | 1/1997 | Ozawa |
| 5,605,126 A | | 2/1997 | Hofmann et al. |
| 5,813,385 A | | 9/1998 | Yamauchi et al. |
| 5,960,767 A | | 10/1999 | Akimoto et al. |
| 5,970,946 A | | 10/1999 | Shea et al. |
| 5,996,548 A | * | 12/1999 | Hellmich .................... 123/295 |
| 6,003,479 A | | 12/1999 | Evans |
| 6,035,822 A | | 3/2000 | Suzuki et al. |
| 6,035,823 A | | 3/2000 | Koike et al. |
| 6,116,211 A | | 9/2000 | Suzuki et al. |
| 6,138,639 A | | 10/2000 | Hiraya et al. |
| 6,158,409 A | | 12/2000 | Gillespie et al. |
| 6,161,518 A | | 12/2000 | Nakakita et al. |
| 6,173,690 B1 | | 1/2001 | Iriya et al. |
| 6,186,113 B1 | | 2/2001 | Hattori et al. |
| 6,209,514 B1 | | 4/2001 | Matayoshi et al. |
| 6,253,728 B1 | | 7/2001 | Matayoshi et al. |

(Continued)

*Primary Examiner*—Hai Huynh
(74) *Attorney, Agent, or Firm*—BRP Legal Services

(57) ABSTRACT

A piston for an internal combustion engine is disclosed. A bowl-shaped recess is constructed in the combustion face of the piston. The recess has a w-shaped cross-section. The w-shaped cross-section is unsymmetrical and has at least one side that is mostly vertical. The recess is positioned off-center in the face of the piston so that fuel that is injected into the cylinder is redirected by the recess toward a center space of the cylinder thereby improving combustion of fuel in the cylinder and preventing fuel from accumulating about a periphery of the combustion chamber.

25 Claims, 4 Drawing Sheets

U.S. PATENT DOCUMENTS

| | | |
|---|---|---|
| 6,257,199 B1 | 7/2001 | Kanda et al. |
| 6,263,855 B1 | 7/2001 | Kobayashi et al. |
| 6,269,789 B1 | 8/2001 | Abe et al. |
| 6,269,790 B1 | 8/2001 | Yi et al. |
| 6,311,668 B1 | 11/2001 | Milam |
| 6,314,933 B1 | 11/2001 | Iijima et al. |
| 6,334,426 B1 | 1/2002 | Sasaki et al. |
| 6,336,437 B1 | 1/2002 | Baiki et al. |
| 6,338,327 B1 | 1/2002 | Ogi et al. |
| 6,349,697 B1 | 2/2002 | Kanda et al. |
| 6,378,486 B1 | 4/2002 | Spiegel et al. |
| 6,378,490 B1 | 4/2002 | Ottowitz et al. |
| 6,435,077 B1 | 8/2002 | Damour et al. |
| 6,443,121 B1 | 9/2002 | Carroll et al. |
| 6,443,122 B1 | 9/2002 | Denbratt et al. |
| 6,460,509 B1 | 10/2002 | Muramatsu et al. |
| 6,499,457 B2 | 12/2002 | Suzuki et al. |
| 6,612,282 B2 * | 9/2003 | Yu .............................. 123/262 |

* cited by examiner

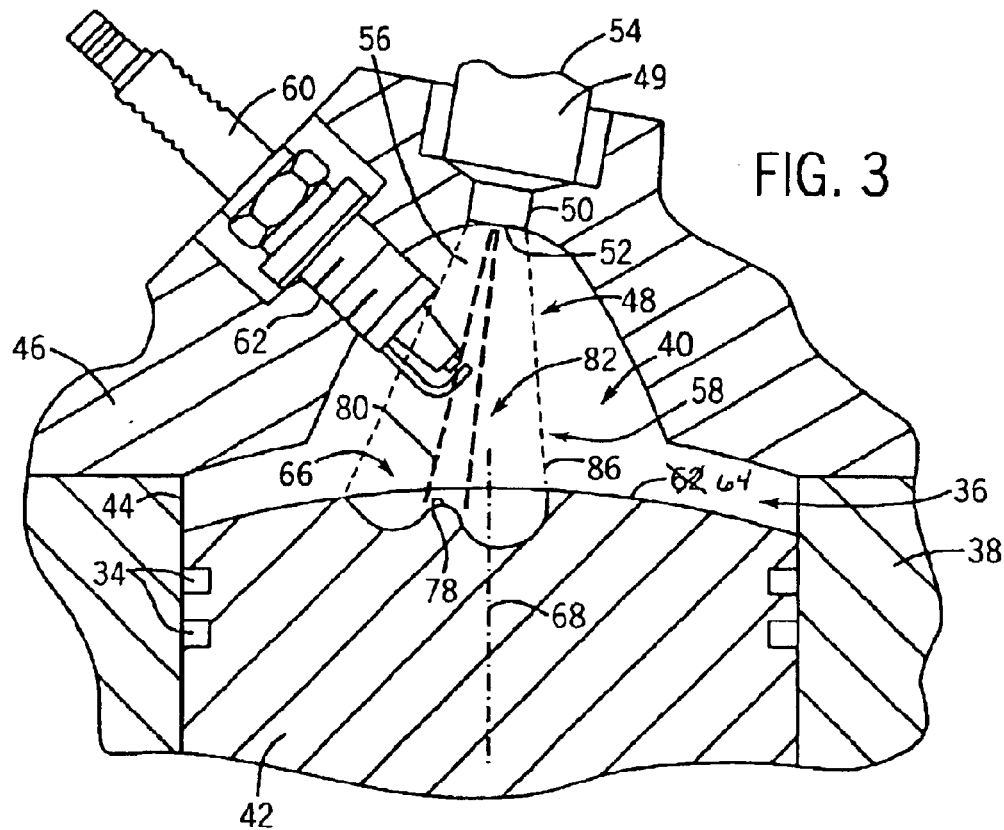

FIG. 10
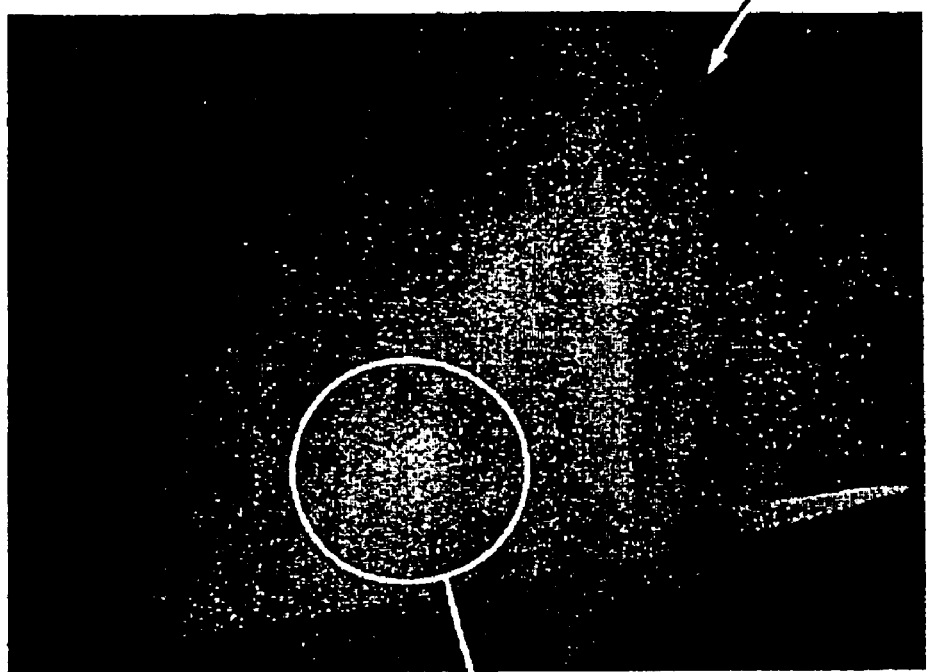
178
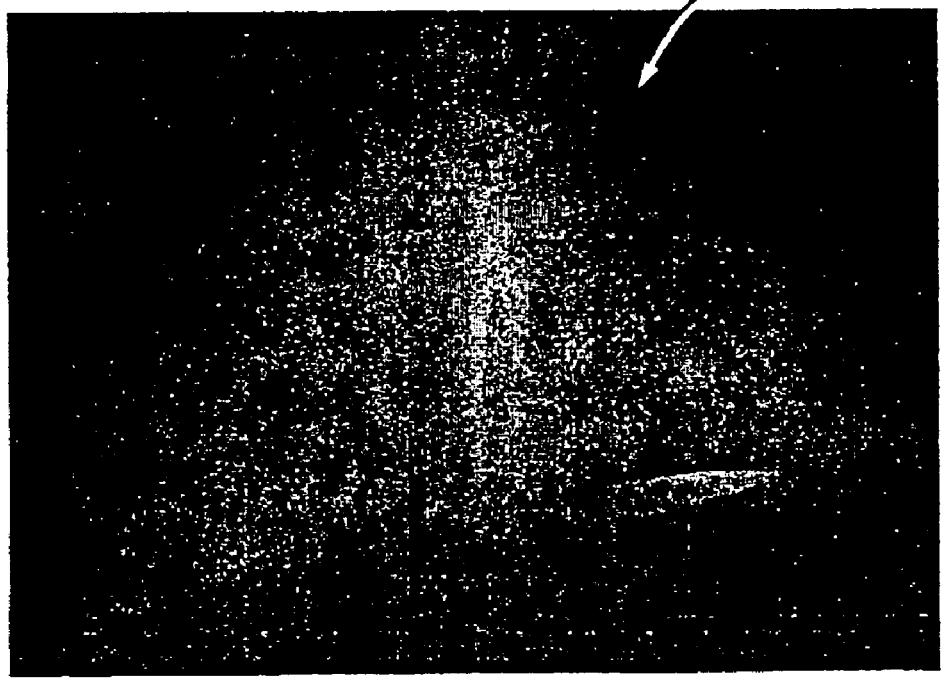
FIG. 11

PISTON FOR SPARK-IGNITED DIRECT FUEL INJECTION ENGINE

BACKGROUND OF INVENTION

The present invention relates generally to pistons for internal combustion engines, and more specifically, to a piston having a uniquely shaped recess formed in the combustion face of the piston.

In general, fuel injected engines include multiple cylinders that receive an atomized fuel injected into the cylinder. The fuel injector provides a fine mist of fuel that mixes with combustion generating gases, generally a mixture of fresh air and any remaining exhaust gases, within the cylinder. This mixture is then compressed and either spark ignited in gasoline engines, or compression ignited in diesel engines. While diesel engines may realize benefits from the present invention, it is primarily directed to fuel injected, spark ignited engines.

In this category of engines, the present invention is applicable to both two-cycle and four-cycle engines. Two-cycle engines are those engines that produce a power stroke with every rotation of the crank shaft. Direct fuel injected engines are those having a fuel injector arranged to inject fuel directly into the cylinder as opposed to port fuel injected engines that mix air and fuel before entry into the cylinder. Two-stroke engines, by nature, are more prone to high exhaust emissions. The two-stroke engine industry, if it is to survive, must maximize efficiency and minimize the emissions to comply with governmental regulations. In the last few years, many advances have been made to advance two-stroke engines toward these goals. Since two-stroke engines are significantly lighter in weight than four-stroke engines, they have a distinct advantage. Recently two-stroke engines manufactured by the Assignee of the present invention have resolved fuel efficiency concerns and reduced emissions to levels unheard of just a few years ago. Two-stroke engines now hold a distinct advantage over four-stroke engines. However, further advancement is desirable to further increase the desirability of two-stroke engines over four-stroke engines in various applications, such as those described above. Two-cycle engines that employ direct fuel injection will receive the most beneficial results with use of the present invention, however, other engines may benefit as well.

In order to improve the combustion process and reduce emission in the exhaust gases, it is desirable to obtain effective mixing and atomization of the fuel within the cylinder space. In so doing, it is desirable to prevent fuel from being accumulated on any surfaces of the combustion chamber. These surfaces include the face of the piston, the cylinder walls, and the area of the cylinder head enclosing the combustion chamber. Fuel accumulated on these surfaces is generally more difficult to ignite than atomized fuel mixed with air.

Fuel injected into the combustion chamber that is not thoroughly atomized and dispersed within the combustion chamber can create areas of uneven combustion. Areas of the combustion mixture having too little fuel lead to a lean burn and areas having too much fuel result in a rich burn. It is widely known that lean and rich burning combustion results in higher levels of pollutants in the exhaust gas as compared to the level of pollutants generated from a burn that is more fully atomized and dispersed within the spark zone.

Additionally, regions of high fuel concentration require more time for the fuel to burn as compared to areas where the fuel concentration is not as high. Often this time delay allows the temperature in the cylinder to drop to a point where the fuel is not readily burned. This type of uneven burning, as discussed above, leads to increased hydrocarbon and soot emissions from the engine. As such, it is important that the fuel injected into the combustion chamber not form regions of high concentration within the mixture.

Also, the surface temperatures of the combustion chamber can negatively effect fuel atomization. The combustion face of the piston, the portion of the cylinder wall within the combustion chamber, and the cylinder head surface enclosing the combustion chamber are generally at a temperature lower than the temperature of the burning fuel/air mixture. This results in a lower temperature burn of the atomized fuel that is in close proximity to these surfaces during the combustion process.

Some prior art diesel pistons include a recess in the piston that is designed to retain fuel for compressive combustion within the bowl. Others have designed the bowl as a means for cooling the head of the piston. Some gasoline-type engines have recesses that are configured to provide clearance for the valves of a four-stroke engine. In other gasoline engines, in order to minimize cylinder head dimensions, the spark plug and fuel injector enter the cylinder from opposite ends, and in these arrangements, the recess is designed to reflect fuel entering the recess from an angle, and redirect the fuel toward the spark plug. These prior art configurations are not very effective at redirecting fuel to maximize efficiency and minimize emissions in two-stroke engines where the fuel injector is located such that the fuel spray is directed nearly vertically and where it is desired that the fuel be redirected generally back toward the fuel injector.

It would therefore be desirable to have an engine with a cylinder arrangement that could receive a fuel mixture from a fuel injector and both provide a thorough mixture of atomized and combustion gas, and direct that mixture toward a preferred combustion area while preventing accumulation of the mixture near the interior surfaces of the combustion chamber.

BRIEF DESCRIPTION OF INVENTION

The present invention provides a piston having a specially designed recess that solves the aforementioned problems.

A piston for an engine is disclosed having a recess formed in the combustion face. The recess is designed to be located in general alignment with a fuel injector during a portion of the pistons travel within a cylinder when the fuel is injected therein. The recess forms a generally circular shape in a compression face of the piston. The recess extends below the compression face and has a nipple in the center of the recess. The nipple rises smoothly from the base of the recess. A tip of the nipple provides a smooth transition up one side of the nipple and down a second side of the nipple. The recess is off center in the piston and has a w-shaped cross-section with one side of the recess being deeper than a second side of the recess. In this manner, atomized fuel injected into the cylinder is redirected by the recess into a central area of the combustion chamber while maintaining the atomization of the fuel.

In accordance with one aspect of the present invention, a piston having a piston skirt and a wrist pin opening therein is disclosed. The piston includes a piston face enclosing one end of the piston skirt and has a bowl-shaped recess formed therein. The bowl-shaped recess has an unsymmetrical w-shaped cross-section whereby atomized fuel that is injected into the recess of the piston is redirected to a preferred combustion area.

In accordance with another aspect of the present invention, an internal combustion engine that includes a piston having a recess therein is disclosed. The piston has the recess formed in a combustion face. A nipple is generally centered within the recess. A radius extends from a center of the nipple to a low point of the recess. The depth of the recess varies about a circumference defined by the radius. As such, the recess does not have a uniform depth below the combustion face so that fuel directed at the recess can be redirected toward a central area of a combustion chamber.

In accordance with another aspect of the present invention, an outboard motor is disclosed. The outboard motor has a powerhead, a midsection, and a lower unit. An engine is situated within the powerhead and has a piston disposed in a cylinder. The engine is equipped with a direct fuel injection system having a fuel injector in direct communication with the cylinder. The piston has a combustion face with an unsymmetrical recess formed therein. The unsymmetrical recess forms a substantially circular shape in the combustion face and has a toroidal shape within the piston. The unsymmetrical recess in the combustion face is off center within the combustion face. The unsymmetrical toroidal shape of the recess redirects atomized fuel into a central portion of a combustion chamber.

In accordance with yet another aspect of present invention, an engine is disclosed that includes a piston positioned within a cylinder. An unsymmetrical recess is formed in the combustion face of the piston. The unsymmetrical recess has a w-shaped cross-section wherein a portion of the recess enters the piston perpendicular to the combustion face.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings:

FIG. 3 is a cross-sectional view of an engine cylinder of the engine shown in FIG. 1.

FIG. 4 is a cross-sectional view of a portion of the piston shown in FIG. 3.

FIG. 5 is a perspective view of a top portion of the piston shown in FIG. 3.

FIG. 10 is a photographic depiction of a fuel flow and atomization resulting from a prior art piston configuration.

FIG. 11 is a photographic depiction of a fuel flow and atomization resulting from the piston of the present invention.

DETAILED DESCRIPTION

Figure 1:
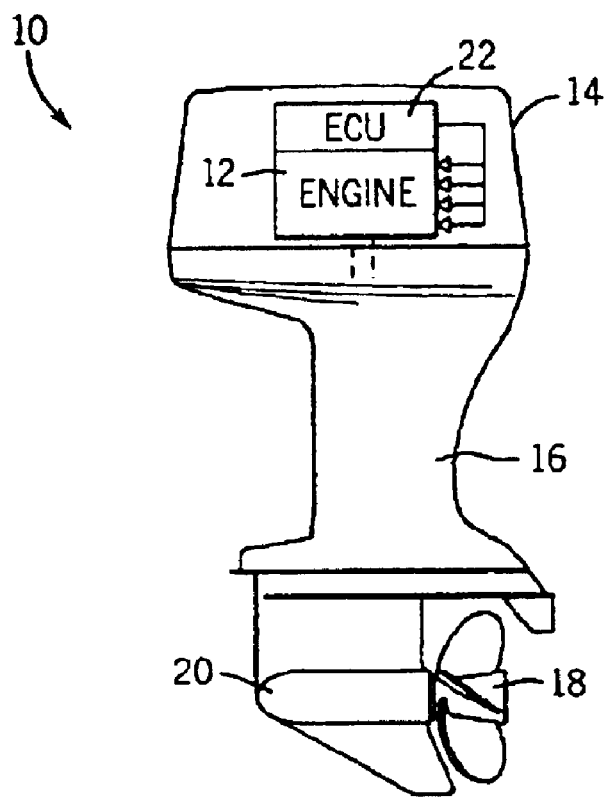
FIG. 1 is an outboard marine engine incorporating the present invention.

The present invention relates to internal combustion engines, and preferably, those incorporating direct fuel injection in a spark-ignited two-cycle gasoline-type engine. FIG. 1 shows an outboard motor 10 having one such engine 12. Engine 12 is housed in a powerhead 14 and supported on a mid-section 16 configured for mounting on the transom of a boat (not shown) in a known conventional manner. An output shaft of engine 12 is coupled to drive a propeller 18 extending rearwardly of a lower gearcase 20 via the midsection 16. The engine 12 is controlled by an electronic control unit (ECU) 22. While the present invention is shown in FIG. 1 as being incorporated into an outboard motor, the present invention is equally applicable with many other applications, some of which include snowmobile, personal watercrafts, lawn and garden equipment, generators, etc.

Figure 2:
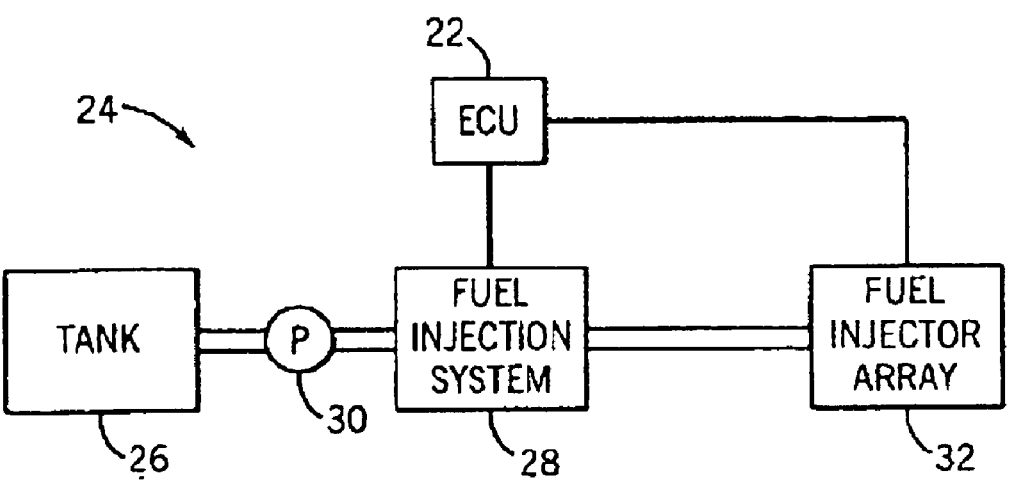
FIG. 2 is a block diagram of a fuel system for use with the marine engine shown in FIG. 1.

Referring to FIG. 2, a block diagram of an exemplary fuel delivery system 24 is illustrated for use with outboard motor 10 of FIG. 1. This particular fuel system employs a single fuel tank 26 connected to a fuel injection system 28 via a primer bulb 30. Primer bulb 30 supplies fuel to fuel injector system 28 prior to starting engine 12. After starting engine 12, ECU 22 controls fuel injection system 28 to provide fuel to a fuel injector array 32 that includes one or more injectors in direct communication with one or more cylinders of the engine.

Fuel injection system 28 can include multiple fuel system components such as a fuel pump, pressure regulators, fuel pressure sensors, fuel coolers, etc. Fuel injector array 32 can include a plurality of individual fuel injectors fluidly connected with a delivery fuel rail and a return fuel rail. The number of fuel injectors being dependent on the number of cylinders of engine 12. The fuel delivery system 24 is constructed to provide individual engine cylinders with fuel from fuel tank 26.

Referring to FIG. 3, the fuel system 24 from FIG. 2 delivers fuel to an exemplary cylinder. One such cylinder 36 is shown in cross-section in FIG. 3. Cylinder 36 is formed in an engine block 38. A combustion chamber 40 is located in an upper portion of cylinder 36. Combustion chamber 40 is defined as the space contained between a piston 42, a cylinder wall 44, and a cylinder head 46. Piston 42 reciprocates in cylinder 36 thereby changing the volume of the combustion chamber 40. At a predetermined point in the travel of the piston 42 in cylinder 36, fuel 48 is injected into combustion chamber 40 by fuel injector 49.

Fuel injector 49 is secured within cylinder head 46 in a fuel injector opening 50. Fuel injector 49 has one end 52 exposed to the combustion chamber 40 and another end 54 connected to fuel system 28, shown in FIG. 2. Fuel injector 49, FIG. 3, injects an atomized fuel spray 56 into cylinder 36 thereby forming a combustion mixture 58 with combustion supporting gas already in a combustion chamber 40. Combustion mixture 58 is ignited by a spark plug 60 controlled by ECU 22. Spark plug 60 is secured to the cylinder head 46 within a spark plug opening 62. Combustion of combustion mixture 58 within combustion chamber 40 forces piston 42 in a downward direction which in effect provides power to drive equipment, such as outboard motor 10, FIG. 1.

Piston 42 has a combustion face 64 exposed to the combustion chamber 40. Combustion face 64 of piston 42 includes a recess 66 formed therein. Recess 66 is preferably unsymmetrical and off-center with respect to a piston center axis 68. Recess 66 is also unsymmetrical with respect to itself. As best viewed in FIG. 4, recess 66 has a cross-section 69 that includes a first depression 70, a second depression 72, and a center section 74. First depression 70 extends further below combustion face 64 than second depression 72. At least one portion 76 of side wall 77 of recess 66 is substantially vertical or parallel to center axis 68.

Located between first depression 70 and second depression 72 is center section 74 of recess 66. Center section 74 has therein a nipple 78. Nipple 78 forms a generally smooth transition from first depression 70 to second depression 72. Nipple 78 preferably does not extend above the combustion face 64 of the piston 42. Recess 66 is designed and situated in piston 42 such that fuel spray 56, FIG. 3, injected into combustion chamber 40 is directed at nipple 78 and into the recess 66. The fuel spray includes a center, mainstream 80, and a peripheral spray 86. The center stream 80 of fuel spray 56 is injected into cylinder 36 from fuel injector 49 directed at nipple 78. Center stream 80 is redirected by nipple 78 and recess 66 into a preferred combustion area 82 of combustion chamber 40. Recess 66 is shaped so that center stream 80 of fuel spray 56 is distributed to preferred combustion area 82 of combustion chamber 40 thereby improving combustion efficiency compared to a combustion mixture that is not evenly distributed within a central area of combustion chamber 40. Referring back to FIG. 4, periphery 84 of recess 66 is constructed so that an outer periphery 86, FIG. 3, of fuel spray 56 is also redirected by recess 66. Outer periphery 86 of fuel spray 56 is also redirected into preferred combustion area 82 of combustion chamber 40. This recess profile provides that a majority of fuel spray 56 injected into cylinder 36 and thereby, into recess 66, is redirected out of recess 66 in an atomized state in a direction toward preferred combustion area 82 of the combustion chamber 40.

The cross-section of recess 66, as shown in FIG. 4, shows the w-shaped recess 66 off-center in the cross-section of the piston 42. FIG. 4 shows the combustion face 64 having a crown-shape. In one embodiment, the recess 66 is bore parallel to the center axis 68. Since the piston face is crowned, the bore will create a w-shaped recess 66 that is unsymmetrical as viewed from a line connecting the outside top edges of the recess. Recess 66 has vertical side 76 located in first depression 70 which is preferably located closer to the center axis 68 of piston 42 than a first side 88. Additionally, first depression 70 of the recess 66 extends further into piston 42 than second depression 72. The transition from first depression 70, over nipple 78, and into second depression 72 shows a relatively smooth, sinusoidal, profile of the nipple 78 to create the w-shape of cross-section 69.

FIG. 5 is a perspective view of piston 42 and shows that periphery 84 of recess 66 has a substantially circular shape in combustion face 64. Periphery 84 is preferably arranged so that recess 66 is off-center, or not concentric to, a perimeter 90 of piston 42. Nipple 78 is centered within recess 66 and includes a center axis 92. The depth of recess 66 varies about a lower periphery 94 of recess 66. A lowest point 96 of lower periphery 94 is at a radius 98 from center axis 92 of nipple 78. Lower periphery 94 of recess 66 varies in depth as radius 98 is rotated 360° about center axis 92. Lowest point 96 of lower periphery 94 of recess 66 is the point of the lower periphery 94 that is preferably closest to the center of piston 42. This orientation dictates that a fuel spray injected into the cylinder, as shown in FIG. 3, is redirected by recess 66 into a center portion of the combustion chamber or a preferred combustion area.

Figure 6:
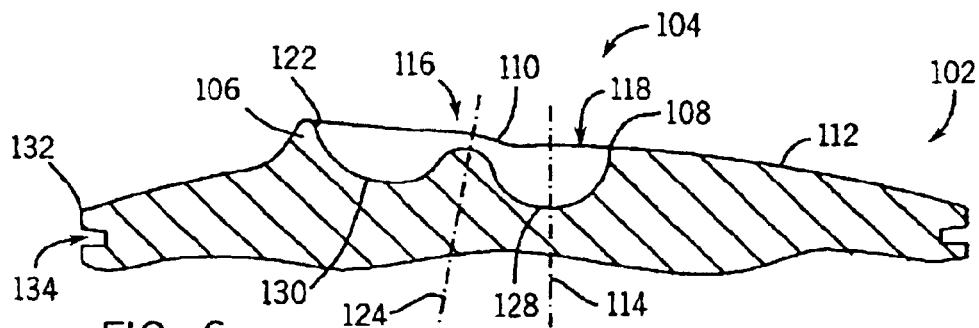
FIG. 6 is a cross-sectional view similar to that of FIG. 4 of an alternate embodiment of the invention.
Figure 7:
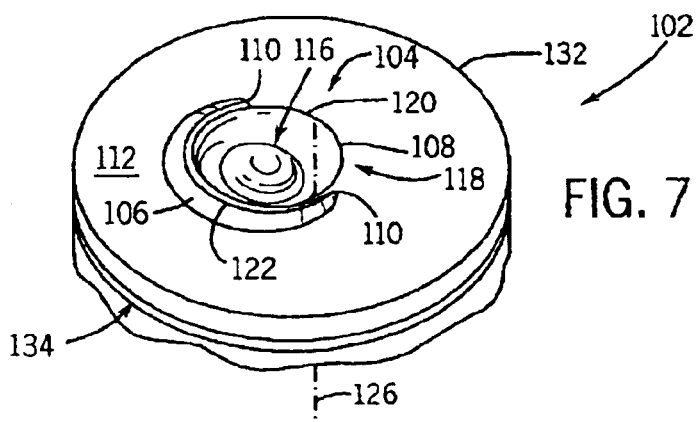
FIG. 7 is a perspective view of a portion of the piston shown in FIG. 6.

An alternative embodiment of the present invention is shown in FIGS. 6 and 7. FIG. 6 shows a piston 102 including a recess 104 that includes a ridge 106. Ridge 106 partially surrounds an outer portion 108 of recess 104 and has a smooth transition 110 into a combustion face 112. Outer portion 108 of recess 104 is that portion of recess 104 that is furthest from piston center axis 114. A nipple 116 is located in the center of recess 104 and is located below a periphery 118 of recess 104. Periphery 118 of recess 104 is formed by an inner portion 120 and a ridge portion 122. Nipple 116 has a center axis 124 that is not parallel to a piston center axis 126. Recess 104, when viewed in cross-section, as shown in FIG. 6, includes a first depression 128 and a second depression 130 separated by nipple 116. This structure forms the w-shaped cross-section of recess 104. First depression 128 of recess 104 is also deeper than the second depression 130. Additionally, center axis 124 of nipple 116 is preferably directed toward a fuel injector when installed in the engine cylinder. Nipple 116, being aligned with a fuel injector, provides that fuel spray that is directed into recess 104 is thereby redirected along the w-shaped cross-section and into a central area of the combustion chamber.

FIG. 7 shows piston 102 with ridge 106 positioned about outer portion 108 of recess 104. Ridge 106 forms a portion of the periphery 118 of recess 104 in combustion face 112. The remaining construction of the recess is similar to that described with reference to FIG. 5.

Figure 8:
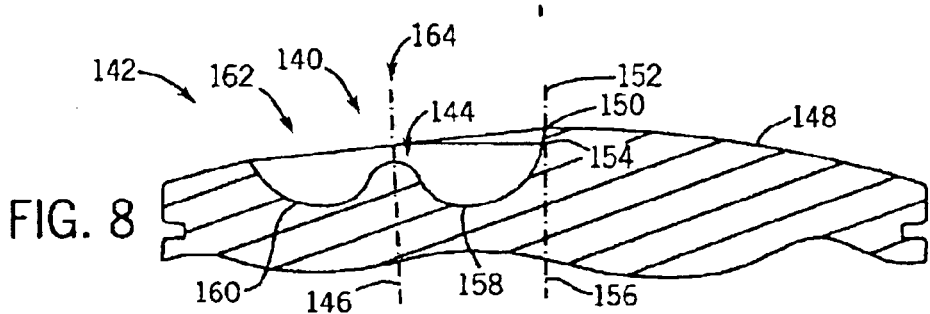
FIG. 8 is a cross-sectional view similar to that of FIG. 4 of an alternate embodiment of the invention.
Figure 9:
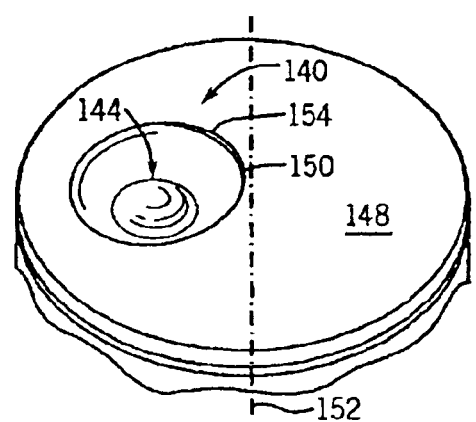
FIG. 9 is a perspective view of a portion of the piston shown in FIG. 8.

FIGS. 8 and 9 show a third embodiment of the present invention. A recess 140, similar to the recess shown in FIGS. 4 and 5, is located in piston 142. Recess 140 includes a nipple 144 located in a center 146 of recess 140. Nipple 144 is contained below a combustion face 148 of piston 142 and is positioned entirely to one side of a center axis 152 of piston 142. Vertical portion 154 of recess 140 is located proximate center axis 152 of piston 142. The vertical portion 154 of recess 140 leads into a first depression 158. Recess 140 also has a second, shallower, depression 160 which is separated from first depression 158 via nipple 144. Nipple 144, first depression 158, and second depression 160, form a w-shaped cross-section 162 of the recess 140. Nipple 144 has a center axis 164 that, is the center of the w-shaped cross-section 162. Center axis 164 is oriented in piston 142 50 that nipple 144 is aligned with a fuel injector. Fuel that is injected into a cylinder containing piston 142 is directed to nipple 144 which redirects the fuel across the recess 140 and into a central area of the cylinder.

FIGS. 10 and 11 show a comparison of combustion mixture distributions within a combustion chamber. FIG. 10 is a photographic representation of the combustion mixture distribution 170 of a prior art piston recess. Within the mixture distribution 170, there is a noticeable region of high fuel concentration 178 and a region of lean fuel distribution on an opposite side. The photographic representation of FIG. 10 shows the problems resolved through implementation of the present invention. FIG. 11 shows the combustion mixture distribution 184 after injection of fuel into a combustion chamber utilizing a piston recess of the present invention. It is evident that the combustion mixture distribution does not contain areas of high concentration or lean concentration but rather a central area of uniform distribution. Additionally, the uniform distribution is contained within a central preferred area rather than about a periphery of the combustion chamber. The uniform distribution within the central area of the combustion chamber provides for a uniform combustion, thereby reducing undesirable pollutants and increasing fuel efficiency.

The present invention contemplates the use of an internal combustion engine with one or more pistons, and more specifically, a piston that includes a recess within its face. One application of the present invention involves a recess that is located entirely below a combustion face of the piston. The recess is off-center in the face of the piston. The recess has a toroidal shape with a first end extending further into the piston than a second end. The center of the toroidal shaped recess forms a nipple that provides a curved transition between the first end and the second end. The deeper end of the toroidal shaped recess is located closest to the center of the piston and furthest from the perimeter of the piston. This construction provides that fuel that is injected into a cylinder containing a piston that utilizes the present invention is thereby injected into the recess. The fuel injected into the recess is redirected by the recess to a center portion of the combustion chamber and away from the cylinder walls. Having a uniform combustion mixture in a center portion of the combustion chamber provides a uniform combustion thereby reducing undesirable combustion byproducts.

In a first embodiment of the present invention, a piston includes a piston skirt with a wrist pin opening therein. The piston includes a piston face that encloses one end of the piston skirt. A bowl-shaped recess with a w-shaped cross-section is formed in the piston face to redirect injected fuel into a central area of a combustion chamber thereby improving combustion.

In accordance with a further embodiment of the present invention, an internal combustion includes a cylinder with a piston disposed therein. The piston includes a combustion face with a recess formed therein. A nipple, having a center, is located within the recess. A radius extends from the center of the nipple to a low point of the recess. The radius, rotated about the center of the nipple, determines a circumference at which the low point of the recess varies in depth below the combustion face of the piston.

In accordance with yet another embodiment of the present invention, an outboard motor includes a direct fuel injection system that includes at least one fuel injector. The piston has a combustion face with an unsymmetrical toroidal shaped recess formed therein. The toroidal shaped recess has a substantially circular shape that is position off-center in the combustion face of the piston.

In accordance with a further embodiment of the present invention, an engine has a piston positioned within a cylinder. An unsymmetrical recess is formed in a combustion face of the piston. The unsymmetrical recess has a w-shaped cross-section. A portion of the w-shaped cross-section enters the piston perpendicular to the combustion face of the piston.

It is to be understood, however, that the present invention is not limited to any particular number of cylinders or type of internal combustion engine.

The present invention has been described in terms of the preferred embodiment, and it is recognized that equivalents, alternatives, and modifications, aside from those expressly stated, are possible and within the scope of the appending claims.

What is claimed is:

1. A piston comprising:
   a piston skirt having therein a wrist pin opening;
   a piston face enclosing one end of the piston skirt and having a bowl-shaped recess formed therein, the bowl-shaped recess having an unsymmetrical w-shaped cross-section;
   the bowl-shaped recess having an uppermost portion that has a substantially circular shape; and
   the bowl-shaped recess being arranged off-center to the piston face.

2. The piston of claim 1 wherein the piston face is crowned, and the unsymmetrical w-shaped cross-section is viewed along a line connecting outside top edges of the recess.

3. The piston of claim 1 wherein the bowl-shaped recess further comprises a nipple, wherein the nipple is below the piston face.

4. The piston of claim 1 wherein the w-shaped cross-section further comprises a first depression and a second depression separated by a center section; wherein the first depression has a greater depth below the piston face than that of the second depression.

5. The piston of claim 4 wherein the center section has a generally sinusoidally shaped nipple between the first depression and the second depression.

6. The piston of claim 1 wherein the bowl-shaped recess is formed to redirect fuel flow from a fuel injector to a preferred combustion area.

7. The piston of claim 1 wherein the w-shaped cross-section forms a general sinusoid from a first edge of the bowl-shaped recess to a second edge of the bowl-shaped recess wherein one valley in the general sinusoid is deeper than another valley of the general sinusoid.

8. The piston of claim 1 incorporated into a two stroke engine having a direct fuel injection system.

9. The piston of claim 8 incorporated into an outboard motor.

10. An internal combustion engine comprising at least one cylinder having therein at least one piston, the piston having:
    a combustion face;
    a recess formed into the combustion face and having an edge formed at the combustion face to the recess; and
    a nipple within the recess, the nipple having a center;
    wherein the recess is defined by a radius extending from the center of the nipple to a low point of the recess, a circumference extending about the nipple at an end of the radius, wherein the low point of the recess varies in depth as measured from the edge of the combustion face at the recess about the circumference;
    wherein the recess is not centered in the combustion face and has an uppermost portion that has a circular shape.

11. The internal combustion engine of claim 10 wherein the nipple is generally centered in the recess and the recess is bore parallel to a central axis of the piston.

12. The internal combustion engine of claim 10 wherein a peak of the nipple is below a plane defined by the combustion face.

13. The internal combustion engine of claim 10 wherein the recess has a w-shaped cross-section having two depressions, one deeper than another, and arranged such that the deeper depression is nearest a center of the combustion face.

14. The internal combustion engine of claim 10 wherein an axis of the nipple is aligned with that of at least a portion of a fuel injector in fluid communication with the at least one cylinder.

15. The internal combustion engine of claim 10 wherein the recess is formed to redirect fuel flow away from the combustion face.

16. An outboard motor comprising:
    a powerhead, a mid-section, and a lower unit, an engine situated in the powerhead, a direct fuel injection system having at least one fuel injector in fluid communication with the engine, the engine further comprising;
    at least one piston disposed within at least one cylinder;
    the at least one piston having a combustion face, wherein the combustion face has an unsymmetrical toroidal-shaped recess formed therein;
    the unsymmetrical toroidal-shaped recess forming a substantially circular shape in the combustion face and arranged off-center within the, combustion face; and a nipple within the recess;

wherein the at least one fuel injector includes an axis that is aligned with an axis of the nipple.

17. The outboard motor of claim 16 wherein the unsymmetrical toroidal-shaped recess has a first end that extends further below the combustion face than a second end.

18. The outboard motor of claim 17 wherein the first end is further from a perimeter of the combustion face than a second end.

19. The outboard motor of claim 16 wherein the nipple is centered within the recess, wherein a peak of the nipple is below a plane of the combustion face and formed to redirect fuel to a desired combustion area.

20. The outboard motor of claim 16 wherein the recess has a sinusoidal cross-sectional shape.

21. An engine comprising:

a piston positioned within a cylinder of the engine;

an unsymmetrical recess formed in a combustion face of the piston wherein the unsymmetrical recess has a w-shaped cross-section and wherein at least a portion of a side wall of the unsymmetrical recess is generally perpendicular to the combustion face; and wherein the recess has an uppermost portion that has a substantially circular shape.

22. The engine of claim 21 wherein the unsymmetrical recess is toroidal-shaped.

23. The engine of claim 21 wherein the w-shaped cross-section forms a general sinusoid.

24. The engine of claim 21 wherein the portion of the side wall of the unsymmetrical recess that is perpendicular to the combustion face is a closest end of the recess to a center of the piston.

25. The engine of claim 21 incorporated into an outboard motor.

* * * * *